3,100,198
BLEND OF AN α-METHYLSTYRENE/ACRYLONITRILE COPOLYMER WITH A COPOLYMER OF α-METHYLSTYRENE AND A DIOLEFIN HAVING STYRENE AND ACRYLONITRILE GRAFTED THEREON
André Fournet and André Rio, Lyon, France, assignors to Societe des Usines Chimiques Rhone-Poulenc, Paris, France, a body corporate of France
No Drawing. Filed Feb. 4, 1960, Ser. No. 6,602
Claims priority, application France Feb. 20, 1959
8 Claims. (Cl. 260—45.5)

This invention relates to new flexible, shock-resistant, thermoplastic compositions based on α-methylstyrene.

α-Methylstyrene is a readily obtainable product now that cumene has become an important starting material for the preparation of phenol being obtained as a by-product in this preparation or prepared directly from cumene. It is therefore desirable to be able to use it in the preparation of polymers.

It is known to polymerise α-methylstyrene into solid thermoplastic products by operating at low temperature and in the presence of a catalyst of the ionic type, but, in contrast to styrene, α-methylstyrene polymerises with difficulty with catalysts of the radical type. It is known that the polymerisation can be facilitated by effecting it in the presence of other and more readily polymerisable monomers, such as acrylonitrile, but the copolymers obtained are fragile. One the other hand if α-methylstyrene is copolymerised with an olefine, for example butadiene, an elastomeric copolymer is obtained.

It is known that polystyrene can be rendered less brittle by mixing it with elastomeric polymers such as are obtained, for example, by copolymerisation of styrene with a diolefine such as butadiene. If it is attempted to apply this method to α-methylstyrene, for example by mixing a rigid copolymer of α-methylstyrene and a small proportion of acrylonitrile with an elastomeric copolymer obtained by copolymerisation of α-methylstyrene with butadiene, it is found that the two copolymers are incompatible. A stiff mass is obtained which, even after the addition of plasticisers, remains unusable, particularly for injection moulding.

It has been proposed to prepare rigid, shock-resistant, thermoplastic compositions by mixing a rigid α-methylstyrene-acrylonitrile copolymer and a grafted copolymer of an elastomer based on butadiene, adding to these mixtures a third constituent which may be either a plasticiser, such as a mixture of α-methylstyrene dimers, or another polymer, such as an elastomer based on butadiene.

It is an object of the present invention to produce flexible, readily worked and entirely homogeneous compositions based on α-methylpolystyrene.

The compositions of the invention comprise mixtures of (a) a copolymer of α-methylstyrene (90–60% by weight) and acrylonitrile (10–40% by weight) and (b) a graft polymer in which the stem is a copolymer of α-methylstyrene and a diolefine in which the proportion of the diolefine is 10–50% by weight and the grafted chains, which are present in amount 5–70% of the weight of the stem polymer, are obtained by polymerisation from one of the following: an acrylic or methacrylic ester; a mixture of styrene and acrylonitrile; a mixture of styrene and an acrylic or methacrylic ester; a mixture of acrylonitrile and an acrylic or methacrylic ester; the α-methylstyrene/acrylonitrile copolymer (a) making up 10–50% by weight, and the graft copolymer 90–50% by weight, of the mixture. Preferred proportions are 30–45% and 70–55% of the respective copolymers.

As the diolefine it is preferred to use 1,3-butadiene, and the optimum content of diolefine, in particular of 1,3-butadiene, in the "stem" of the graft polymer is 25–35%. If the proportion of diolefine in the stem portion of the graft copolymer exceeds 50%, the two components are found not to be sufficiently compatible to permit the formation of a homogeneous mixture.

The rigid copolymer of α-methylpolystyrene and acrylonitrile can be made by any of the known methods, for example by copolymerising the monomers in an aqueous emulsion containing as catalyst potassium persulphate.

The elastomeric copolymer can also be obtained by known processes, for example by emulsion copolymerisation of α-methylstyrene and butadiene in the indicated proportions in the presence of peroxide catalysts such for example as cumene hydroperoxide.

The grafting on the elastomeric copolymer may be effected by polymerising the monomer or mixture of monomers to be grafted, in the presence of the copolymer in an aqueous emulsion, using known polymerisation conditions.

A monomer mixture for grafting onto the elastomeric copolymer may contain the individual monomers in any proportions. For example with a mixture of styrene and acrylonitrile the proportions may vary between 10:90 and 90:10 parts by weight. The most favourable proportions for the further working of the grafted copolymer are 60 parts styrene to 40 parts acrylonitrile.

The final mixture can be made by known methods. For example aqueous emulsions of the two copolymers may be mixed, and the mixture coagulated, washed, dried and ground; or the copolymers may be mixed by working on the rolls after being isolated from their emulsions.

The new compositions can readily be worked without the addition of a plasticiser or a third polymer; for example they can very usefully be employed in any of the usual extrusion, injection or vacuum-forming methods. Their use is recommended for the manufacture of sheets and flexible articles, and articles made from them have a glossy appearance, high resistance to shock and to bending and excellent high-temperature stability.

The following example illustrates the invention without limiting it in any way. "Parts" and proportions given are by weight.

*Example*

A copolymer (a) containing 80% by weight of α-methylstyrene and 20% of acrylonitrile, and having a specific viscosity of 0.1 (measured in 0.2% solution in dimethylformamide) was made by emulsion polymerisation in the known way using potassium persulphate as catalyst.

A graft copolymer (b) was made by polymerising 25 parts of a styrene/acrylonitrile mixture containing 60% of styrene in aqueous emulsion in the presence of 75 parts of a butadiene/α-methylstyrene copolymer containing 30% of butadiene.

The two resulting copolymer emulsions (a) and (b) were thoroughly mixed, after which a mixture of the solid copolymer was obtained by coagulation from the emulsion, followed by washing, drying and grinding.

The resulting composition on injection moulding at 170° C. gave a product having the following properties.

Degrees Martens _____ 78°.
Modulus of elasticity _____ 70 kg./mm.$^2$.
Brinell hardness _____ 4.1 kg./mm.$^2$.
Tensile strength _____ 2.1 kg./mm.$^2$.
Breaking elongation _____ 31%.
Breaking energy:
   Direction parallel to injection ____ 81 kg./cm./cm.$^2$.
   Direction perpendicular to injection _____ 95 kg./cm./cm.$^2$.
Flexural strength:
   Direction parallel to injection ____ 4.4 kg./mm.$^2$.
   Direction perpendicular to injection _____ 3.5 kg./mm.$^2$.
Breaking angle:
   Direction parallel to injection ____ Greater than 90°.
   Direction perpendicular to injection _____ Greater than 90°.

The breaking energy, flexural strength, and breaking angle were determined on a Dynstat apparatus according to the German standard DIN 53,453. This machine is the equivalent of Charpy and Izod machines used for measuring impact strength according to the ASTM standard D256.

We claim:
1. Flexible homogeneous thermoplastic compositions which contain, as sole polymeric constituents, a mixture of (a) 10 to 50 parts of a resinous copolymer of 90 to 60 parts of α-methylstyrene and 10 to 40 parts of acrylonitrile and (b) 90 to 50 parts of a rubbery copolymer of 50 to 90 parts of α-methylstyrene and 50 to 10 parts of a conjugated diolefine, on to which rubbery copolymer there have been grafted by polymerization 5 to 70 parts of mixtures of styrene and acrylonitrile per 100 parts of said copolymer, all the said parts being by weight.

2. Flexible homogeneous thermoplastic compositions which contain, as sole polymeric constituents, a mixture of (a) 10 to 50 parts of a resinous copolymer of 90 to 60 parts of α-methylstyrene and 10 to 40 parts of acrylonitrile and (b) 90 to 50 parts of a rubbery copolymer of 50 to 90 parts of α-methylstyrene and 50 to 10 parts of 1,3-butadiene, onto which rubbery copolymer there have been grafted by polymerisation 5 to 70 parts of mixtures of styrene and acrylonitrile per 100 parts of said copolymer, all the said parts being by weight.

3. Compositions according to claim 2 wherein the proportion of 1,3-butadiene in the rubbery copolymer is 23–35% by weight.

4. Compositions according to claim 2 wherein the proportions of α-methylstyrene copolymer (a) and the graft copolymer (b) are 30–45% and 70–55% respectively.

5. Process for the production of shaped articles which comprises shaping at temperatures at which they become soft a composition the polymeric constituents of which consist essentially of a mixture of (a) 10 to 50 parts of a resinous copolymer of 90 to 60 parts of α-methylstyrene and 10 to 40 parts of acrylonitrile and (b) 90 to 50 parts of a rubbery copolymer of 50 to 90 parts of α-methylstyrene and 50 to 10 parts of a conjugated diolefine, onto which rubbery copolymer there have been grafted by polymerisation 5 to 70 parts of mixtures of styrene and acrylonitrile per 100 parts of said copolymer, all the said parts being by weight.

6. Process for the production of shaped articles which comprises shaping at temperatures at which they become soft a composition the polymeric constituents of which consist essentially of a mixture of (a) 10 to 50 parts of a resinous copolymer of 90 to 60 parts of α-methylstyrene and 10 to 40 parts of acrylonitrile and (b) 90 to 50 parts of a rubbery copolymer of 50 to 90 parts of α-methylstyrene and 50 to 10 parts of 1,3-butadiene, onto which rubbery copolymer there have been grafted by polymerisation 5 to 70 parts of mixtures of styrene and acrylonitrile per 100 parts of said copolymer, all the said parts being by weight.

7. Process according to claim 6 wherein the proportion of 1,3-butadiene in the rubbery copolymer is 23–35% by weight.

8. Process according to claim 6 wherein the proportions of α-methylstyrene copolymer (a) and the graft copolymer (b) are 30–45% and 70–55% respectively.

References Cited in the file of this patent
UNITED STATES PATENTS
2,802,808     Hayes _____ Aug. 13, 1957
FOREIGN PATENTS
649,166     Great Britain _____ Jan. 17, 1951